United States Patent
Hori

(10) Patent No.: US 6,261,473 B1
(45) Date of Patent: Jul. 17, 2001

(54) WORKING FLUID CONTAINING 1,1-DIFLUOROETHANE, 1,1,2,2-TETRAFLUOROETHANE AND CARBON DIOXIDE

(75) Inventor: Masahiro Hori, Yokohama (JP)

(73) Assignee: Kabushiki Kaisha Sanai, Kumamoto-ken (JP)

( * ) Notice: Subject to any disclaimer, the term of this patent is extended or adjusted under 35 U.S.C. 154(b) by 0 days.

(21) Appl. No.: 09/339,275

(22) Filed: Jun. 23, 1999

(30) Foreign Application Priority Data

Jun. 26, 1998 (JP) .................................................. 10-180738

(51) Int. Cl.[7] .................................................. C09K 5/00
(52) U.S. Cl. .................................................. 252/67; 62/114
(58) Field of Search .................................................. 252/67; 62/114

(56) References Cited

U.S. PATENT DOCUMENTS 4,294,716 * 10/1981 Saccavino et al. .................... 252/68

FOREIGN PATENT DOCUMENTS

| 4116274 | * 11/1992 | (DE) . |
| 8-67870 | 3/1996 | (JP) . |
| 10-265771 | * 10/1998 | (JP) . |
| 94/17153 | * 8/1994 | (WO) . |
| 98/08912 | * 3/1998 | (WO) . |

* cited by examiner

Primary Examiner—Necholus Ogden
(74) Attorney, Agent, or Firm—Reed Smith LLP

(57) ABSTRACT

A working fluid comprising 1,1-difluoroethane (HFC-152a) of formula (1), 1,1,1,2-tetrafluoroethane (HFC-134a) of formula (2), and carbon dioxide. This can provide a new working fluid which not only functions satisfactorily as a working fluid, but also exerts little influence on ozone layer depletion and global warming.

5 Claims, 1 Drawing Sheet

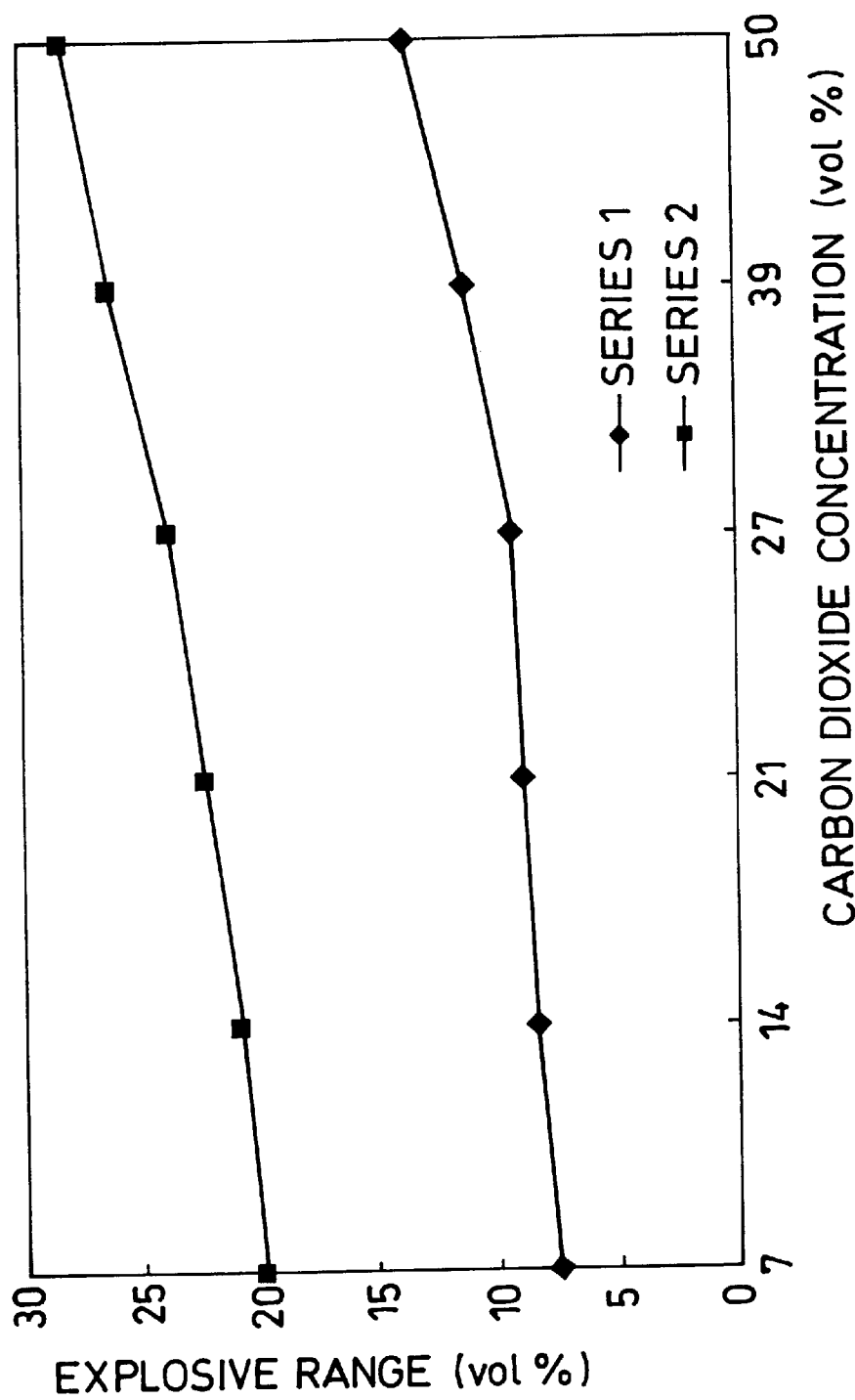

WORKING FLUID CONTAINING 1,1-DIFLUOROETHANE, 1,1,2,2-TETRAFLUOROETHANE AND CARBON DIOXIDE

BACKGROUND OF THE INVENTION

This invention relates to working fluids used as refrigerants for room air conditioners, car air conditioners (air conditioners for automobiles), refrigerators, freezers and the like.

Conventionally, halogenated hydrocarbons called freons have been known as working fluids for appliances such as room air conditioners, car air conditioners, refrigerators and freezers, and they are used at a condensing temperature and/or an evaporating temperature in the range of −15 to 50° C. Among others, HCFC-22 (chlorodifluoromethane) is the commonest refrigerant for use in domestic room air conditioners and building air conditioners, the specified freon CFC-11 (trichloromonofluoromethane) is the commonest refrigerant for use as a foaming agent and a propellant and for use in turborefrigerating machines and large-sized refrigerators, and CFC-12 (dichlorodifluoromethane) is the commonest refrigerant for use in reciprocating compression refrigerating machines. Up to the present, these specified freons have been widely used as working fluids for refrigerating and air conditioning applications such as air conditioners, electric refrigerators, car coolers, window coolers, train air conditioners, food refrigerating plants and factory cooling systems.

However, since these specified freons severely destroys the ozone layer in the stratosphere, their production was totally abolished in the January of 1996 under an international treaty. Consequently, the substitute freon HCFC-22 is being provisionally used. However, since HCFC-22 has an ODP [i.e., ozone depletion potential based on CFC-11 (=1.0)] of 0.055, its production will be gradually decreased from 2004 and totally abolished in 2030. In place of this, substitute freons obtained by replacing the chlorine of halogenated hydrocarbons with hydrogen, such as HFC-134a (1,1,1,2-tetrafluoroethane), has already been practically used as refrigerants for car air conditioners, domestic electric refrigerators and the like. HFC-134a, which has an ODP of 0, is chiefly used as a substitute freon all over the world and is now being produced by major substitute freon makers in the world. However, HFC-134a is recently attracting attention in that its HGWP [i.e., global warming potential based on CFC-11 (=1.0)] is as high as 0.28, and this problem was discussed at the Kyoto Conference (COP3). In this connection, the HGWP of HFC-134a is said to be more than several thousand times as high as that of carbon dioxide.

In view of these circumstances, the present inventors carried on intensive investigations in order to develop a new working fluid which not only functions satisfactorily as a working fluid, but also exerts little influence on ozone layer depletion and global warming. As a result, it has been found that HFC-152a (1,1-difluoroethane) has an ODP of 0 and an HGWP of 0.03 and hence serves as a working fluid meeting the above-described requirements. Moreover, this HFC-152a has an atmospheric life of 1.5–1.7 years, which is much shorter, for example, than the atmospheric life of HFC-134a (i.e, 15 years). Also from this point of view, HFC-152a can be a working fluid which is gentle to the global environment. What is better is that HFC-152a has a high refrigerating capacity and a high coefficient of performance, and may be used as a working fluid in an amount equal to 60–70% or less of that of HFC-134a. Thus, HFC-152a exerts little influence on global warming and is also excellent from an economic point of view.

However, this HFC-152a has the only problem with safety, in that its explosive range is from 4.6 to 16.9% by volume. Recently, the use of a combustible gas (e.g., butane) as a working fluid has been being investigated in Europe and the like, and has been put into practice to some extent. When a combustible gas is used as a working fluid, conventional appliances such as air conditioners, refrigerators and freezers cannot be directly used without considerable alterations such as an increase in equipment size. Paying attention to this point, the present inventors have searched for a technique which makes it possible to use conventional appliances such as air conditioners, refrigerators and freezers without any alteration and to secure excellent safety.

In order to improve safety, German Patent No. DE4116274 has proposed the idea that 4 to 25% by weight of an inert gas (e.g., carbon dioxide) may be added to HFC-152a. However, no detailed data on its practice are disclosed and this technique remains obscure. In fact, it is difficult to improve the safety of HFC-152a solely by adding thereto a low concentration of an inert gas. On the other hand, if a high concentration of an inert gas is added thereto, its performance as a working fluid will be markedly reduced. Thus, the mere idea of adding an inert gas does not make it possible to use HFC-152a safely and efficiently as a working fluid.

According to the same concept, Japanese Patent Provisional Publication No. 67870/'96 has proposed that the combustibility problem of HFC-32 (difluoromethane) can be solved by adding a slight amount of carbon dioxide to a combination of HFC-32 and HFC-134a. However, this can only solve the problem concerning the combustibility of leakage gas at low temperatures, and fails to secure overall safety. For example, no mention is made of the safety in the event of leakage of all the working fluid composition, and this working fluid cannot necessarily regarded as safe.

Moreover, these reports rely solely on an idea or theory, and it is highly questionable whether the proposed working fluids may be directly applied to conventional appliances such as air conditioners, refrigerators and freezers in current use. Thus, these working fluids are considered to have demerits, for example, in that they require considerable alterations in the appliances. That is, although safety can be enhanced by the addition of an inert gas such as carbon dioxide, the resulting working fluid is impractical if its refrigerating capacity and coefficient of performance are low. Accordingly, it is an important problem to define the composition of a working fluid. The working fluid so defined will be economically useful if it can be directly applied to conventional appliances such as air conditioners, refrigerators and freezers in current use.

SUMMARY OF THE INVENTION

In order to solve the above-described problems, the present inventors have carried on intensive investigations with a view to developing a working fluid which has an ODP of 0, a low HGWP, and excellent safety from the viewpoint of combustibility and the like, exhibits a high refrigerating capacity and a high coefficient of performance when used as a working fluid, and can be directly applied to conventional appliances such as air conditioners, refrigerators and freezers in current use, by adding carbon dioxide to HFC-152a in a limited range of amount and further adding HFC-134a, as a third component, in a limited range of amount. As a result, it has been found that a composition as defined below meets these requirements. The present invention has been completed on the basis of this finding.

That is, the present invention relates to a working fluid comprising 1,1-difluoroethane (HFC-152a) of the following formula (1), 1,1,1,2-tetrafluoroethane (HFC-134a) of the following formula (2), and carbon dioxide.

$$CHF_2-CH_3 \quad (1)$$

$$CF_3-CH_2F \quad (2)$$

BRIEF DESCRIPTION OF THE DRAWINGS

FIG. 1 is a graph showing the lower explosive limit and upper explosive limit of HFC-152a having carbon dioxide added thereto.

In FIG. 1, the symbols ♦ and ■ represent the lower and upper explosive limits, respectively.

DETAILED DESCRIPTION OF THE PREFERRED EMBODIMENTS

The working fluid in accordance with the present invention is a composition preferably comprising 30 to 80% by weight of HFC-152a, 10 to 60% by weight of HFC-134a, and 1 to 30% by weight of carbon dioxide, and more preferably comprising 60 to 80% by weight of HFC-152a, 10 to 20% by weight of HFC-134a, and 5 to 20% by weight of carbon dioxide. This composition provides a novel working fluid which has an ODP of 0, a low HGWP, and excellent safety from the viewpoint of combustibility and the like, exhibits a high refrigerating capacity and a high coefficient of performance when used as a working fluid, and can be directly applied to conventional appliances such as air conditioners, refrigerators and freezers in current use.

All of the compositions within the scope of the present invention have an ODP of 0 and clear the major requirement about the ozone depletion coefficient. Moreover, in the case, for example, of a composition comprising 70% by weight of HFC-152a, 15% by weight of HFC-134a, and 15% by weight of carbon dioxide, its HGWP is 0.07. Thus, the HGWP can be reduced to about ¼ as compared with HFC-134a alone. Furthermore, since the working fluid of the invention may be used in an amount equal to 70% or less of that of conventional HFC-134a, its effective HGWP is not greater than 0.05 and exerts very little influence on global warming.

According to the present invention, limited amounts of HFC-134a and carbon dioxide are added to HFC-152a in order to solve the problem of combustibility and the like without detracting from the refrigerating capacity and the coefficient of performance when it is used as a working fluid. The explosive range of HFC-152a is from 4.6 to 16.9% by volume. For a common 450-liter refrigerator which is considered to be most risky, if the total amount (120 g) of HFC-152a (although such refrigerators in current use are charged with about 170 g of HFC-134a, HFC-152a having a high refrigerating capacity and a high coefficient of performance may be used in an amount equal to about 70% or less of that of HFC-134a) has leaked therein, the HFC-152a gas concentration in the refrigerator is 9.1% by volume which is within the explosive range and hence dangerous. If carbon dioxide is added to HFC-152a in order to avoid such danger, its explosive range varies as shown in FIG. 1. It can be seen therefrom that, if carbon dioxide concentration exceeds about 10% by volume, its lower explosive limit becomes 9.1% by volume or greater.

In order to improve incombustibility, it is preferable to add carbon dioxide in large amounts. However, if its amount added is unduly large, the resulting composition encounters problems with its performance as a working fluid, in that its coefficient of performance and refrigerating capacity are reduced and the pressure of the system is raised. Table 1 shows changes in coefficient of performance and refrigerating capacity when carbon dioxide is added to HFC-152a, and Table 2 shows changes in the pressure of the system. In particular, since a rise in the pressure of the system causes fatal damage to its practical use, it is a pressing need to solve these problems.

TABLE 1

| Symbol | HFC-152a (mol %) | Carbon dioxide (mol %) | Coefficient of performance | Refrigerating capacity (kcal/kg) |
|---|---|---|---|---|
| A | 90 | 10 | 5.90 | 59.2 |
| B | 80 | 20 | 5.82 | 57.5 |
| C | 70 | 30 | 5.74 | 55.7 |
| D | 60 | 40 | 5.65 | 53.8 |

In this table, the evaporating temperature is −15° C. and the condensing temperature is 30° C.

TABLE 2

| Symbol | −30 | −20 | −10 | 0 | 10 | 20 | 30 | 40 | 50 | 60 | 70 | 80 | 90 |
|---|---|---|---|---|---|---|---|---|---|---|---|---|---|
| A | 1.1 | 1.7 | 2.5 | 3.6 | 5.1 | 6.9 | 9.1 | 12 | 15 | 19 | 24 | 30 | 36 |
| B | 1.4 | 2.2 | 3.2 | 4.6 | 6.4 | 8.7 | 10 | 15 | 19 | 24 | 30 | 37 | 45 |
| C | 1.9 | 2.9 | 4.2 | 5.9 | 8.1 | 11 | 14 | 19 | 24 | 30 | 37 | 46 | 56 |
| D | 2.5 | 3.7 | 5.4 | 7.5 | 10 | 14 | 18 | 23 | 30 | 37 | 46 | 57 | 70 |

In this table, the unit of pressure is $kg/cm^2$.

In order to overcome these problems, it has been attempted to add HFC-134a as a third component and thereby create a composition which has excellent safety and shows no significant increase in HGWP while maintaining its performance as a working fluid. Thus, it has been found that the desired working fluid can be obtained when the amount of HFC-134a added is in the range of 10 to 60% by weight and preferably 10 to 20% by weight. Table 3 shows changes in coefficient of performance and refrigerating capacity when carbon dioxide and HFC-134a are added to HFC-152a, and Table 4 shows changes in the pressure of the system.

TABLE 3

| Symbol | HFC-152a (mol %) | HFC-134a (mol %) | Carbon dioxide (mol %) | Coefficient of performance | Refrigerating capacity (kcal/kg) |
|---|---|---|---|---|---|
| E | 90 | 5 | 5 | 5.86 | 58.2 |
| F | 80 | 15 | 5 | 5.72 | 54.9 |
| G | 80 | 10 | 10 | 5.75 | 55.7 |
| H | 70 | 20 | 10 | 5.62 | 52.5 |
| I | 70 | 10 | 20 | 5.67 | 54 |
| J | 70 | 5 | 25 | 5.71 | 54.8 |

TABLE 3-continued

| Symbol | HFC-152a (mol %) | HFC-134a (mol %) | Carbon dioxide (mol %) | Coefficient of performance | Refrigerating capacity (kcal/kg) |
|---|---|---|---|---|---|
| K | 60 | 30 | 10 | 5.48 | 49.7 |
| L | 60 | 20 | 20 | 5.53 | 50.8 |
| M | 60 | 10 | 30 | 5.58 | 52.2 |
| N | 40 | 40 | 20 | 5.25 | 45.4 |
| O | 40 | 20 | 40 | 5.33 | 47 |
| P | 20 | 40 | 40 | 5.03 | 41.6 |
| Q | 20 | 20 | 60 | 5.07 | 42.6 |
|   | 100 | 0 | 0 | 5.97 | 60.8 |
|   | 0 | 100 | 0 | 4.76 | 37 |

In this table, the evaporating temperature is −15° C. and the condensing temperature is 30° C.

TABLE 4

| Symbol | −30 | −20 | −10 | 0 | 10 | 20 | 30 | 40 | 50 | 60 | 70 | 80 | 90 |
|---|---|---|---|---|---|---|---|---|---|---|---|---|---|
| E | 1.0 | 1.5 | 2.2 | 3.2 | 4.5 | 6.1 | 8.2 | 11 | 14 | 17 | 22 | 27 | 33 |
| F | 1.0 | 1.5 | 2.2 | 3.2 | 4.5 | 6.1 | 8.2 | 11 | 14 | 18 | 22 | 27 | 33 |
| G | 1.1 | 1.7 | 2.5 | 3.6 | 5.0 | 6.8 | 9.1 | 12 | 15 | 19 | 24 | 30 | 37 |
| H | 1.1 | 1.7 | 2.5 | 3.6 | 5.1 | 6.9 | 9.2 | 12 | 15 | 20 | 25 | 30 | 37 |
| I | 1.4 | 2.2 | 3.2 | 4.6 | 6.3 | 8.6 | 11 | 15 | 19 | 24 | 30 | 37 | 46 |
| J | 1.6 | 2.5 | 3.6 | 5.2 | 7.2 | 9.7 | 13 | 17 | 21 | 27 | 33 | 41 | 51 |
| K | 1.1 | 1.7 | 2.5 | 3.7 | 5.1 | 7.0 | 9.3 | 12 | 16 | 20 | 25 | 31 | 38 |
| L | 1.4 | 2.1 | 3.2 | 4.6 | 6.4 | 8.6 | 12 | 15 | 19 | 24 | 31 | 38 | 46 |
| M | 1.8 | 2.8 | 4.1 | 5.8 | 8.0 | 11 | 14 | 19 | 24 | 30 | 37 | 46 | 57 |
| N | 1.4 | 2.2 | 3.3 | 4.7 | 6.6 | 8.9 | 12 | 15 | 20 | 25 | 31 | 39 | 48 |
| O | 2.3 | 3.5 | 5.2 | 7.3 | 10 | 14 | 18 | 24 | 30 | 38 | 48 | 59 | — |
| P | 2.3 | 3.5 | 5.2 | 7.5 | 10 | 14 | 19 | 24 | 31 | 39 | 49 | 62 | — |
| Q | 3.9 | 5.9 | 8.6 | 12 | 16 | 22 | 29 | 37 | 48 | 60 | 76 | — | — |

In this table, the unit of pressure is kg/cm$^2$.

It is evident from Table 4 that, if the content of carbon dioxide exceeds 30%, the system shows a sudden rise in pressure at high temperatures and is hence unsuitable for practical use. Moreover, it is evident from Table 3 that, even if the content of carbon dioxide is not greater than 30%, higher contents of HFC-134a cause a reduction in coefficient of performance and refrigerating capacity to compromise the high performance of HFC-152a. On the basis of these results, the present inventors have been convinced that, if the content of carbon dioxide is in the range of 1 to 30% by weight and preferably 5 to 20% by weight and the content of HFC-134a is in the range of 10 to 60% by weight and preferably 10 to 20% by weight, there can be obtained an excellent working fluid which has excellent safety and shows no significant increase in HGWP while maintaining its performance as a working fluid.

All of the working fluids falling within the compositional range defined by the present invention satisfactorily meet the previously described requirement that the lower explosive limit must be not less than 9.1% by volume, and are hence considered to be very safe working fluids.

The working fluids of the present invention have the advantage that they may be applied to conventional appliances such as air conditioners, refrigerators and freezers in current use, without making alterations thereon. Although a variety of working fluids have been developed thus far, most of them require considerable alterations in conventional appliances and, therefore, have always been provided in the form of new models of air conditioners, refrigerators, freezers and the like. However, this is very disadvantageous from an economic point of view and imposes a particularly heavy burden on users. The working fluids of the present invention may be said to be excellent working fluids which have been developed with consideration for this point.

Moreover, when the working fluids of the present invention are applied to conventional appliances such as air conditioners, refrigerators and freezers in current use, they may be used in an amount equal to 70% or less of that of conventional HFC-134a and are hence economically advantageous working fluids from this point of view. Furthermore, they show an effective HGWP of not greater than 0.05 and exert very little influence on global warming.

Even when the working fluids of the present invention are applied to conventional appliances such as air conditioners, refrigerators and freezers in current use, without making alterations thereon, they exert little influence on the parts of the appliances which come into contact with the refrigerant, and are hence adequate for practical purposes. The parts of the appliances which come into contact with the refrigerant include fusible plugs made of a copper alloy, O-rings made of rubber, suction hoses made of rubber, suction pipes made of aluminum, suction joints made of iron, and the like. The influence exerted on these parts by the working fluids of the present invention is equal to or less than that of conventionally used HFC-134a.

Although the working fluids of the present invention can be used without any odorant, an alkyl mercaptan may be added thereto as an odorant. Preferred examples thereof include methyl mercaptan, ethyl mercaptan, n-propyl mercaptan, i-propyl mercaptan, n-butyl mercaptan, i-butyl mercaptan and t-butyl mercaptan.

The working fluids of the present invention have very excellent refrigerant characteristics in that their coefficient of performance and refrigerating capacity are equal to or higher than those of HFC-134a. Moreover, they are economically advantageous in that their amount required for use as refrigerants is about 70% or less of that of HFC-134a. Furthermore, they have an ODP of 0, a HGWP of 0.07 which is lower than that of HFC-134a (i.e., 0.25), and an effective HGWP of not greater than 0.05 because they may be used in an amount equal to 70% or less of that of HFC-134a. Thus, they provide refrigerants which are very gentle to the global environment. In addition, the working fluids of the present invention have the additional advantage that they do not require the development of new apparatus but may be directly applied to conventional appliances such as air conditioners, refrigerators and freezers in current use.

The working fluids of the present invention are useful as refrigerants for use in room air conditioners, car air conditioners, refrigerators, freezers and the like, and as working fluids for standard refrigeration.

EXAMPLES

The working fluids of the present invention are more fully explained with reference to the following examples.

However, it is to be understood that the present invention is not limited to these examples.

Example 1

Explosive limit test on mixed refrigerants comprising HFC-152a, HFC-134a and carbon dioxide were carried out according to the following procedure.

A specified explosion vessel fitted with platinum electrodes for electrical discharge, a pressure gage, an air intake valve, an HFC-152a suction valve, an HFC-134a suction valve and a carbon dioxide suction valve was charged with predetermined amounts of HFC-152a, HFC-134a and carbon dioxide by sucking them in while regulating their partial pressures, and the sparked. The sparking was continued for 0.3 second, and three trials for ignition were made in each test. In order to keep the test conditions constant, the second and further trials were made after the pressure returned to its original level. In determining the explosive limit, if an explosion first occurred at a certain concentration, a test was repeated at an immediately lower concentration. When a lack of explosion was confirmed, the former concentration was regarded as the explosive limit.

The results thus obtained are shown in Table 5.

TABLE 5

| Symbol | HFC-152a (mol %) | HFC-134a (mol %) | Carbon dioxide (mol %) | Lower explosive limit (vol %) | Upper explosive limit (vol %) |
|---|---|---|---|---|---|
| a | 100 | 0 | 0 | 4.7 | 16.8 |
| b | 93 | 0 | 7 | 8.7 | 20.0 |
| c | 86 | 0 | 14 | 9.9 | 21.1 |
| d | 79 | 0 | 21 | 10.6 | 22.5 |
| e | 73 | 0 | 27 | 11.0 | 24.0 |
| f | 61 | 0 | 39 | 13.1 | 26.5 |
| g | 50 | 0 | 50 | 15.6 | 28.5 |
| h | 90 | 10 | 0 | 7.3 | 18.1 |
| i | 80 | 20 | 0 | 8.8 | 19.8 |
| A | 80 | 15 | 5 | 9.3 | 20.5 |
| B | 78 | 10 | 12 | 9.9 | 20.1 |
| C | 72 | 13 | 15 | 10.7 | 21.5 |
| D | 63 | 21 | 16 | 11.0 | 23.5 |
| E | 58 | 13 | 29 | 12.8 | 24.6 |

As is evident from Table 5, it may be said that the refrigerants of the present invention have a lower explosive limit of not less than 9.1% by volume and hence meet the safety requirements satisfactorily.

Example 2

The car model used in this example was Toyota Caldina Wagon (manufactured in 1994, having a displacement of 2,000 cc and using HFC-134a as the refrigerant in a specified charge weight of 750 g). After HFC-134a was extracted by vacuum suction, 276 g of HFC-152a [boiling point, −24° C.; vapor pressure, 596.0 kPa (25° C.); latent heat of vaporization, 327.5 kJ/kg (boiling point); ODP, 0; HGWP, 0.03], 138 g of HFC-134a [boiling point, −26.2° C.; vapor pressure, 665.7 kPa (25° C.); latent heat of vaporization, 178.0 kJ/kg (boiling point); ODP, 0; HGWP, 0.253], and 46 g of carbon dioxide [liquefied carbon dioxide; specific gravity, 1.101 (−37° C.); boiling point, −78.5° C.; latent heat of vaporization, 284.0 kJ/kg (−20° C.)] were charged. Moreover, an odorant comprising ethyl mercaptan was added to this mixed refrigerant in an amount of 10 ppm on a vapor volume basis. The results of performance tests on this mixed refrigerant used in a car air conditioner were as follows.

Specifically, air was internally circulated at an outside temperature of 34.3° C. and an inside temperature of 34.60° C., and the outlet temperature of the car air conditioner was measured. The results of measurements are shown in Table 6.

TABLE 6

| Time elapsed (minutes) | Outlet temperature (° C.) | Minimum temperature during time (° C.) | State of engine |
|---|---|---|---|
| 0 | 34.3 | | |
| 1 | 19.3 | 17.5 | Idling |
| 5 | 16.3 | 15.8 | Idling |
| 8 | 16 | 15.9 | Idling |
| 15 | 13.6 | 11 | 1750–2000 rpm |
| 17 | 9.8 | 9.0 | 1750–2000 rpm |
| 24 | 6.7 | 6.3 | 1750–2000 rpm |

Eight minutes after starting the operation, the outlet temperature was lowered to 16° C. and approached a minimum temperature in an idling state. Thereafter, no appreciable change was noted till the lapse of 14 minutes. Accordingly, the lowest possible temperature of this car model in an idling state was judged to be about 16° C., and measurements were then made at a rotational speed (rpm) corresponding to a running state. As a result, the outlet temperature was lowered to approximately the thermostatically preset temperature (i.e., the lowest level) 8 minutes after starting the measurements in a running state, indicating a more excellent cooling effect than was achievable with CFC-12. Moreover, no smell of ethyl mercaptan was noticed during operation, indicating that there was no leak of the refrigerant. The performance of the mixed refrigerant containing no odorant was exactly the same as that of the mixed refrigerant having the odorant added thereto.

Example 3

Performance tests on a refrigerant for use in car air conditioners were carried out under the same conditions as described in Example 2, except that 243 g of HFC-152a, 199 g of HFC-134a, 18 g of carbon dioxide, and 5 ppm of ethyl mercaptan were used. Thus, the following results were obtained.

Specifically, air was internally circulated at an outside temperature of 32.4° C. and an inside temperature of 33.5° C., and the outlet temperature of the car air conditioner was measured. The results of measurements are shown in Table 7.

TABLE 7

| Time elapsed (minutes) | Outlet temperature (° C.) | Minimum temperature during time (° C.) | State of engine |
|---|---|---|---|
| 0 | 32.4 | | |
| 1 | 20.5 | 18.5 | Idling |
| 5 | 17.4 | 16.7 | Idling |
| 8 | 17.0 | 16.9 | Idling |
| 15 | 14.6 | 12.1 | 1750–2000 rpm |
| 17 | 10.9 | 10.0 | 1750–2000 rpm |
| 24 | 7.9 | 7.5 | 1750–2000 rpm |

The results thus obtained were almost similar to those of Example 2. It was confirmed that no smell of ethyl mercaptan was noticed during testing and the refrigerant was functioning stably. The performance of the mixed refrigerant containing no odorant was exactly the same as that of the mixed refrigerant having the odorant added thereto.

Example 4

Performance tests on a refrigerant for use in car air conditioners were carried out under the same conditions as described in Example 2, except that 322 g of HFC-152a, 83 g of HFC-134a, 55 g of carbon dioxide, and 4 ppm of methyl mercaptan were used. Thus, the following results were obtained.

Specifically, air was internally circulated at an outside temperature of 33.8° C. and an inside temperature of 34.9° C., and the outlet temperature of the car air conditioner was measured. The results of measurements are shown in Table 8.

TABLE 8

| Time elapsed (minutes) | Outlet temperature (° C.) | Minimum temperature during time (° C.) | State of engine |
|---|---|---|---|
| 0 | 34.9 | | |
| 1 | 20.7 | 19.0 | Idling |
| 5 | 17.6 | 16.9 | Idling |
| 8 | 17.0 | 16.8 | Idling |
| 15 | 11.8 | 10.8 | 1750–2000 rpm |
| 17 | 10.7 | 9.9 | 1750–2000 rpm |
| 24 | 7.3 | 7.0 | 1750–2000 rpm |

The results thus obtained were almost similar to those of Example 2. It was confirmed that no smell of methyl mercaptan was noticed during testing and the refrigerant was functioning stably. The performance of the mixed refrigerant containing no odorant was exactly the same as that of the mixed refrigerant having the odorant added thereto.

Example 5

Performance tests on a refrigerant for use in car air conditioners were carried out under the same conditions as described in Example 2, except that 299 g of HFC-152a, 143 g of HFC-134a, 18 g of carbon dioxide, and 3 ppm of ethyl mercaptan were used. Thus, the following results were obtained.

Specifically, air was internally circulated at an outside temperature of 33.0° C. and an inside temperature of 34.0° C., and the outlet temperature of the car air conditioner was measured. The results of measurements are shown in Table 9.

TABLE 9

| Time elapsed (minutes) | Outlet temperature (° C.) | Minimum temperature during time (° C.) | State of engine |
|---|---|---|---|
| 0 | 33.9 | | |
| 1 | 21.0 | 19.3 | Idling |
| 5 | 17.2 | 16.8 | Idling |
| 8 | 16.9 | 16.6 | Idling |
| 15 | 11.2 | 10.3 | 1750–2000 rpm |
| 17 | 10.7 | 9.8 | 1750–2000 rpm |
| 24 | 7.2 | 7.0 | 1750–2000 rpm |

The results thus obtained were almost similar to those of Example 2. It was confirmed that no smell of ethyl mercaptan was noticed during testing and the refrigerant was functioning stably. The performance of the mixed refrigerant containing no odorant was exactly the same as that of the mixed refrigerant having the odorant added thereto.

Comparative Example 1

Performance tests on a car air conditioner using a refrigerant comprising HFC-134a alone were carried out in the car model of Example 2, and the results thus obtained are shown in Table 10. Air was internally circulated at an outside temperature of 32.4° C., and the temperature setting was on the lowest level.

TABLE 10

Charged with a specified amount of HFC-134a

| Time elapsed (minutes) | Outlet temperature (° C.) | State of engine |
|---|---|---|
| 0 | 37.0 | Idling |
| 3 | 25.4 | Idling |
| 8 | 16.3 | Idling |
| 10 | 14.5 | Idling |
| 20 | 11.2 | Idling |
| 24 | 9.9 | 1750–2000 rpm |

The performance tests on the car air conditioner using HFC-134a alone revealed that its performance was similar to that obtained by the mixed refrigerants of the present invention. However, in view of the fact that the HGWP of HFC-134a is several thousand times as high as that of carbon dioxide, HFC-134a is not thought to be a desirable refrigerant because the release of HFC-134a from used cars into the atmosphere promotes the warming of the global environment. In contrast, the novel refrigerants of the present invention have a lower HGWP than HFC-134a, exhibits performance equal to or higher than that of HFC-134a when used in car air conditioners, and may hence be said to be excellent refrigerants having well-balanced properties.

Comparative Example 2

The car model used in this example was Toyota Starlet (having a displacement of 1,300 cc), and its car air conditioner was charged with 500 g of HFC-134a and 50 g of refrigerating machine oil. Performance tests on this car air conditioner were carried out, and the results thus obtained are shown in Table 11. Air was internally circulated at an outside temperature of 36.0° C., and the temperature setting was on the lowest level.

TABLE 11

| Time elapsed (minutes) | Outlet temperature (° C.) | State of engine |
|---|---|---|
| 0 | 40.0 | |
| 1 | 22.4 | |
| 5 | 16.3 | Idling |
| 7 | 15.5 | Idling |
| 10 | 14.2 | Idling |
| 15 | 13.8 | 1750–2000 rpm |
| 17 | 14.0 | 1750–2000 rpm |

Comparative Example 3

In the same car model as used in Comparative Example 2, its car air conditioner was charged with 500 g of CFC-12. Performance tests on this car air conditioner were carried out, and the results thus obtained are shown in Table 12. Air was internally circulated at an outside temperature of 31.0° C., and the temperature setting was on the lowest level.

TABLE 12

| Time elapsed (minutes) | Outlet temperature (° C.) | State of engine |
| --- | --- | --- |
| 0 | 28.1 | Idling |
| 3 | 16.5 | Idling |
| 10 | 15.2 | Idling |
| 15 | 14.0 | 1750–2000 rpm |
| 20 | 13.2 | Idling |
| 60 | 9.8 | Idling |

Example 6

Using an electric refrigerator (with an internal volume of 450 liters) manufactured by Mitsubishi Electric Corp., 185 g of HFC-134a was extracted by vacuum suction. Then, 88 g of HFC-152a, 18 g of HFC-134a, and 14 g of carbon dioxide were charged. Moreover, an odorant comprising ethyl mercaptan was added to this mixed refrigerant in an amount of 10 ppm on a vapor volume basis.

A practical test on this refrigerator containing the mixed refrigerant was carried out by using it in everyday life for 18 months and observing its state at intervals of 3 months. For purposes of comparison, a similar practical test was carried out for 18 months by using another refrigerator of the same type without replacing the refrigerant. The results thus obtained are shown in Table 13. The temperature setting was "medium".

TABLE 13

| Refrigerant used | | 0 mo. | 3 mo. | 6 mo. | 9 mo. | 12 mo. | 15 mo. | 18 mo. |
| --- | --- | --- | --- | --- | --- | --- | --- | --- |
| Inventive refrigerant | Refrigerator (° C.) | 4 | 5 | 4 | 3 | 4 | 5 | 4 |
| | Freezer (° C.) | −14 | −13 | −13 | −14 | −14 | −13 | −14 |
| HFC-134a | Refrigerator (° C.) | 5 | 5 | 4 | 4 | 5 | 5 | 4 |
| | Freezer (° C.) | −13 | −13 | −13 | −14 | −14 | −13 | −13 |

Example 7

In a stainless steel pressure vessel having an inner diameter of 100 mm and a height of 250 mm and fitted with a thermometer and a pressure gauge, a magnetic stirrer for stirring use (with an outer skin formed of Teflon) and a 5/8 inch rubber O-ring for use in car air conditioners were placed. Then, the pressure vessel was charged with 73 g of HFC-152a, 15 g of HFC-134a, 12 g of carbon dioxide, and 20 g of refrigerating machine oil. By placing this pressure vessel in a thermostatic chamber, the temperature of the system was adjusted to 85° C. and held at that temperature for 120 hours while its contents were stirred by the magnetic stirrer. After cooling, the pressure vessel was opened, the rubber O-ring was taken out, and a change in rubber diameter was measured.

After measurement of the rubber diameter, the O-ring was subjected to a tension test at a pulling rate of 10.0 mm/min. The tension test was carried out at a temperature of 21° C. and a relative humidity of 50%. For purposes of comparison, another 5/8 inch rubber O-ring was placed in the same testing apparatus. Then, the pressure vessel was charged with 100 g of HFC-134a and 20 g of refrigerating machine oil. By placing this pressure vessel in a thermostatic chamber, the temperature of the system was adjusted to 85° C. and held at that temperature for 120 hours while its contents were stirred by the magnetic stirrer. After cooling, the pressure vessel was opened, the rubber O-ring was taken out, and a change in rubber diameter was measured. After measurement of the rubber diameter, the O-ring was subjected to a tension test at a pulling rate of 10.0 mm/min. The tension test was carried out at a temperature of 21° C. and a relative humidity of 50%. Changes in the rubber diameter of the rubber O-rings and the rates of change in the cross-sectional area thereof are shown in Table 14, and the results of tension tests are shown in Table 15.

TABLE 14

| | Rubber diameter (mm) | Cross-sectional area (mm$^2$) | Rate of change in cross-sectional area (%) |
| --- | --- | --- | --- |
| New O-ring | 2.4 | 4.52 | — |
| After soaking in (inventive refrigerant + lubricating oil) | 2.6 | 5.31 | 17.4 |
| After soaking in (HFC-134a + lubricating oil) | 2.7 | 5.72 | 26.6 |

TABLE 15

| | Maximum load (N) | Rate of change (%) |
| --- | --- | --- |
| New O-ring | 215.0 | — |
| After soaking in (inventive refrigerant + lubricating oil) | 169.8 | −21.1 |
| After soaking in (HFC-134a + lubricating oil) | 129.5 | −39.8 |

As described above, the novel refrigerants of the present invention have performance equal to or higher than that of conventional refrigerants, may be used in an amount equal to 70% or less of that of conventional refrigerants, and may hence be said to be refrigerants which are gentle to the global environment. When continuous operation tests on car air conditioners charged with such refrigerants were carried out for more than 15 months, they functioned stably in that no change in performance with time was observed and no leakage of the odorant and hence the mixed refrigerant was noticed. Moreover, the working fluids of the present invention have excellent safety. Even if an automobile using such a refrigerant encounters a crash accident, there is no possibility that the refrigerant may be ignited. Thus, they may be said to be very safe working fluids.

Many other variations and modifications of the invention will be apparent to those skilled in the art without departing from the spirit and scope of the invention. The above-described embodiments are, therefore, intended to be merely exemplary, and all such variations and modifications are intended to be included within the scope of the invention as defined in the appended claims.

The disclosure of Japanese Patent Application No. 10-180738 filed on Jun. 26, 1998 including specification, claims, drawings and summary are incorporated herein by reference in its entirety.

What is claimed is:

1. A working fluid for use in conventional appliances including air conditioners, refrigerators and freezers consisting of 30 to 80% by weight of 1,1-difluoroethane, 10 to 60% by weight of 1,1,1,2-tetrafluorothnane, and 1 to 30% by weight of carbon dioxide, wherein the working fluid is used in the conventional appliances without any alteration.

2. A working fluid for use in conventional appliances including air conditioners, refrigerators and freezers consisting of 60 to 80% by weight of 1,1-difluoroethane, 10 to 20% by weight of 1,1,1,2-tetrafluoroethane, and 5 to 20% by weight of carbon dioxide, wherein the working fluid is used in the conventional appliances without any alteration.

3. A working fluid for use in conventional appliances including air conditioners, refrigerators and freezers consisting of 1,1-difluoroethane of the following formula (1), 1,1,2,2-tetrafluoroethane of the following formula (2), carbon dioxide and an alkyl mercaptan of the following formula (3), wherein the amount of alkyl mercaptan is not greater than 25 ppm on a vapor volume basis and the working fluid is used in the conventional appliances without any alteration:

$$CHF_2-CH_3 \quad (1)$$

$$CF_3-CH_2F \quad (2)$$

$$C_nH_{2n+1}SH \quad (3)$$

wherein n is an integer of 1 to 4.

4. A working fluid for use in conventional appliances including air conditioners, refrigerators and freezers consisting of 30 to 80% by weight of 1,1-difluoroethane, 10 to 60% by weight of 1,1,2,2-tetrafluoroethane, 1 to 30% by weight of carbon dioxide and an alkyl mercaptan of the following formula (3), wherein the amount of alkyl mercaptan is not greater than 25 ppm on a vapor volume basis and the working fluid is used in the conventional appliances without any alteration:

$$C_nH_{2n+1}SH \quad (3)$$

wherein n is an integer of 1 to 4.

5. A working fluid for use in conventional appliances including air conditioners, refrigerators and freezers consisting of 60 to 80% by weight of 1,1-difluoroethane, 10 to 20% by weight of 1,1,2,2-tetrafluoroethane, 5 to 20% by weight of carbon dioxide and an alkyl mercaptan of the following formula (3), wherein the amount of alkyl mercaptan is not greater than 25 ppm on a vapor volume basis and the working fluid is used in the conventional appliances without any alteration:

$$C_nH_{2n+1}SH \quad (3)$$

wherein n is an integer of 1 to 4.

* * * * *